(12) United States Patent
Poornachandran et al.

(10) Patent No.: US 10,511,578 B2
(45) Date of Patent: Dec. 17, 2019

(54) TECHNOLOGIES FOR SECURE CONTENT DISPLAY WITH PANEL SELF-REFRESH

(71) Applicant: Intel Corporation, Santa Clara, CA (US)

(72) Inventors: Rajesh Poornachandran, Portland, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 15/061,494

(22) Filed: Mar. 4, 2016

(65) Prior Publication Data

US 2017/0256304 A1 Sep. 7, 2017

(51) Int. Cl.
*G06F 21/60* (2013.01)
*H04L 29/06* (2006.01)
*G06F 1/3234* (2019.01)
*G06F 21/50* (2013.01)
*G09G 5/00* (2006.01)
*H04L 9/08* (2006.01)

(52) U.S. Cl.
CPC ........ *H04L 63/0435* (2013.01); *G06F 1/3275* (2013.01); *G06F 21/50* (2013.01); *G06F 21/606* (2013.01); *G09G 5/001* (2013.01); *H04L 9/0833* (2013.01); *H04L 9/0841* (2013.01); *H04L 9/0897* (2013.01); *H04L 63/0428* (2013.01); *H04L 63/061* (2013.01); *H04L 63/126* (2013.01); *Y02D 10/13* (2018.01); *Y02D 10/14* (2018.01)

(58) Field of Classification Search
CPC .............................. G06F 21/50; G06F 21/606
See application file for complete search history.

(56) References Cited

U.S. PATENT DOCUMENTS

| 7,007,304 | B1* | 2/2006 | Girard | G06F 21/79 |
| | | | | 726/30 |
| 7,089,426 | B1* | 8/2006 | Bagshaw | G06F 21/84 |
| | | | | 380/200 |
| 8,243,082 | B1* | 8/2012 | Wyatt | G06F 3/1438 |
| | | | | 345/502 |

(Continued)

*Primary Examiner* — Thaddeus J Plecha
(74) *Attorney, Agent, or Firm* — Barnes & Thornburg LLP

(57) ABSTRACT

Technologies for secure content display include a computing device having a display controller and a display. The display includes a self-refresh frame buffer. The computing device establishes a secure, attested communication session between the display controller and the display device. Attestation may be performed using an enhanced privacy identifier key provisioned to the display controller and/or the display by the corresponding manufacturer. The display controller may transmit protected content from a protected audio/video path to the display over the secure communication session. The display controller may transmit a command to the display to disable read back of the self-refresh frame buffer. The display controller may transmit a command to the display to clear the frame buffer. The display controller may transmit a predefined image frame from secure storage to the display. The predefined image frame may be an advertisement or user-defined content. Other embodiments are described and claimed.

21 Claims, 4 Drawing Sheets

(56) References Cited

U.S. PATENT DOCUMENTS

| | | | |
|---|---|---|---|
| 2003/0200435 A1* | 10/2003 | England | G06F 21/445 |
| | | | 713/172 |
| 2006/0269056 A1* | 11/2006 | Montag | H04N 5/913 |
| | | | 380/205 |
| 2010/0053180 A1* | 3/2010 | Ostiguy | G06F 21/84 |
| | | | 345/531 |
| 2012/0173877 A1* | 7/2012 | Pendakur | G06F 21/123 |
| | | | 713/169 |
| 2013/0111219 A1* | 5/2013 | Avanch | G06F 21/00 |
| | | | 713/189 |
| 2014/0108805 A1* | 4/2014 | Smith | G06F 21/64 |
| | | | 713/171 |
| 2016/0119302 A1* | 4/2016 | Yi | H04N 21/436 |
| 2016/0378990 A1* | 12/2016 | Goodman | G06F 21/572 |
| | | | 726/19 |

* cited by examiner

TECHNOLOGIES FOR SECURE CONTENT DISPLAY WITH PANEL SELF-REFRESH

BACKGROUND

Reducing power consumption is increasingly important for current computing devices, particularly for mobile computing devices and other power-constrained systems. For most devices, graphics processing and display are major power consumers. Typically, a display panel must be constantly refreshed with frame buffer data from the main memory of the device. However, in many common usage scenarios, the device may often display a static image (e.g., while reading, web browsing, word processing, working with email communication, etc.). Certain display panels may reduce power consumption by supporting panel self-refresh (PSR), also known as display self-refresh. PSR-capable panels include a local memory frame buffer (e.g., a DRAM buffer) that may retain the last-rendered frame. The PSR-capable panel may display the static image from its internal buffer. Other components of the computing device such as the processor or SoC may power down while the panel is in PSR mode. The panel may resume rendering images from main memory when the displayed image changes. In some devices, the contents of the local frame buffer of the display may be read back by software or by an external display interface such as HDMI.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
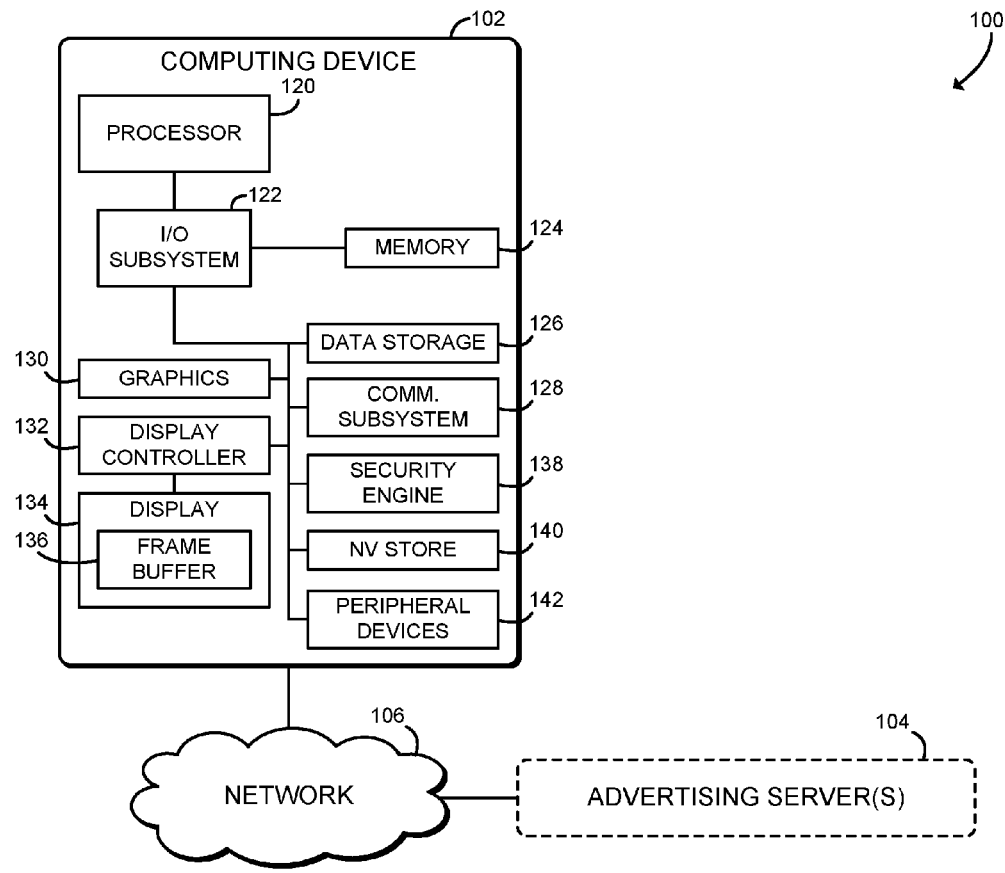
FIG. 1 is a simplified block diagram of at least one embodiment of a computing device for secure content display with panel self-refresh.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 102 for secure content display with panel self-refresh includes a processor 120, a display controller 132, and a display 134 with a self-refresh frame buffer 136. In use, as described below, the computing device 102 establishes a secure, attested communication session between the display controller 132 and the display 134. The display controller 132 and the display 134 may attest to their capabilities and origin using one or more enhanced privacy identifier (EPID) keys provisioned during manufacture. Control commands and data such as protected content are exchanged over the secure communication session. The display controller 132 may send commands to the display 134 to disable panel read back, and in response the display 134 prevents the contents of the frame buffer 136 from being read by the display controller 132 and/or other components. Additionally or alternatively, the display controller 132 may send commands to the display 134 to clear the contents of the frame buffer 136. In some embodiments, the display controller 132 may transmit a predefined image frame such as an advertisement from secure storage to the display 134 to replace the contents of the frame buffer 136. In some embodiments, the advertisements may be downloaded from one or more advertising servers 104 over a network 106. Thus, the system 100 may allow for attestation and/or authorization between a display controller 132 (or associated system-on-a-chip) and a display 134 produced by different manufacturers, which may prevent or detect unauthorized integration and/or alteration of components. The system 100 may also protect display data as it is transmitted over the "last inch" from the display controller 132 to the display 134. The system 100 also may prevent unauthorized leaks of frame data from the self-refresh frame buffer 136 of the display 134. Additionally, by transmitting image frames to the display 134 from secure storage while closing the secure communication session, the system 100 may allow for additional personalization and/or monetization of the computing device 102.

The computing device 102 may be embodied as any type of device capable of securely displaying content and otherwise performing the functions described herein. For example, the computing device 102 may be embodied as, without limitation, a laptop computer, a notebook computer, a tablet computer, a smartphone, a wearable computing device, a computer, a multiprocessor system, a consumer electronic device, a smart appliance, and/or any other computing device capable of secure content display. As shown in FIG. 1, the illustrative computing device 102 includes a processor 120, an I/O subsystem 122, a memory 124, a data storage device 126, and a communication subsystem 128. Of course, the computing device 102 may include other or additional components, such as components commonly found in a smartphone (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. In some embodiments, the processor 120 may include support for establishing and/or protecting one or more trusted execution environments. For example, the trusted execution support may be embodied as Intel® Software Guard Extensions (SGX) technology, Intel® Trusted Execution Technology (TXT), ARM® TrustZone™, a firmware trusted platform module (TPM), or other trusted execution support. Similarly, the memory 124 may be embodied as any type of volatile or non-volatile memory or data storage capable of performing the functions described herein. In operation, the memory 124 may store various data and software used during operation of the computing device 102 such operating systems, applications, programs, libraries, and drivers.

The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, the processor graphics 130, the display controller 132, and/or other components of the computing device 102 on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. For example, the data storage device 126 may be embodied as one or more eMMC flash memory modules. The communication subsystem 128 may be embodied as any communication circuit, device, or collection thereof, capable of enabling communications between the computing device 102 and other remote devices over the network 106, such as one or more advertising servers 104. The communication subsystem 128 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As illustrated in FIG. 1, the computing device 102 further includes a processor graphics 130, a display controller 132, and a display 134. The processor graphics 130 may be embodied as any processor graphics, graphics processing unit (GPU), or other circuit or collection of circuits capable of rendering two-dimensional and/or three-dimensional graphics. The processor graphics 130 may also include media processing circuitry, such as accelerated video decoding circuitry and/or accelerated video encoding circuitry. Although illustrated as separate functional blocks, it should be understood that in some embodiments the functionality of the processor graphics 130 may be incorporated in one or more other components of the computing device 102, such as the processor 120, the I/O subsystem 122, and/or the display controller 132.

The display controller 132 may be embodied as any card, controller circuit, IP core, functional block, or other component capable of receiving image frame data from the processor graphics 130 and/or the memory 124 and outputting display signals to the display 134. The display controller 132 may communicate with the display 134 using a physical interface and display protocol, such as the display serial interface (DSI) specified by the MIPI® Alliance. As described above, the display controller 132, along with the processor graphics 130 and other graphics rendering components and/or media processing components, may be integrated with the processor 120 or otherwise form a portion of an SoC.

The display 134 of the computing device 102 may be embodied as any type of display capable of displaying digital information, such as a liquid crystal display (LCD), a light emitting diode (LED), a plasma display, a cathode ray tube (CRT), or other type of display device. The display 134 is capable of panel self-refresh (PSR) and includes a local frame buffer 136. The frame buffer 136 may store the last-rendered frame, and the display 134 may be capable of displaying the static contents of the last-rendered frame from the frame buffer 136. In the illustrative embodiment, the display 134 is integrated in the computing device 102, for example as a display screen of a smart phone or a notebook computer. The display 134 may be produced by a different manufacturer and/or vendor from the display controller 132 or other components of the computing device 102. In some embodiments, the display 134 may be externally connected to the computing device 102. As described further below, the display 134 may establish a secure, attested communication channel with the display controller 132. To support establishing the secure, attested channel, the display 134 may include cryptographic capabilities similar to an embedded smart card, such as key storage, cryptographic, and random-number generation capabilities.

As shown, the computing device 102 further includes a security engine 138 and a nonvolatile ("NV") store 140. The security engine 138 may be embodied as any hardware component(s) or circuitry capable of providing security-related services to the computing device 102. In particular, the security engine 138 may include a microprocessor, microcontroller, or other embedded controller capable of executing firmware and/or other code independently and securely from the processor 120. Thus, the security engine 138 may be used to establish a trusted execution environment for the computing device 102. The security engine 138 may communicate with the processor 120 and/or other components of the computing device 102 over a dedicated bus, such as a host embedded controller interface (HECI). The security engine 138 may also provide remote configuration, control, or management of the computing device 102. In the illustrative embodiment, the security engine 138 is embodied as a converged security and manageability engine (CSME) incorporated in a system-on-a-chip (SoC) of the computing device 102. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication subsystem 128 or a dedicated communication circuit independently of the state of the computing device 102 (e.g., independently of the state of the main processor 120), also known as "out-of-band" communication.

The NV store 140 may be embodied as any device configured for persistent storage of data when the computing device 102 is powered down or disconnected from a power supply. In the illustrative embodiment, the NV store 140 is a flash memory chip. In other embodiments, the NV store 140 may be embodied as a small amount of complementary metal-oxide semiconductor ("CMOS") memory coupled with a battery backup or other non-volatile memory. The NV store 140 may be used to store platform firmware for the computing device 102, as well as firmware configuration variables such as configuration settings, boot targets, and other information that should persist across reboots. The NV store 140 typically has a relatively small storage capacity compared to the data storage device 126, but is available to the computing device 102 upon initial boot. The NV store 140 may also include one or more secure storage regions, in which data may be inaccessible or otherwise protected from unauthorized access by software executed by the computing device 102 or other unauthorized components of the computing device 102. In some embodiments, a partition or other part of the NV store 140 may be dedicated to the security engine 138 and may be used by the security engine 138 for secure storage. In some embodiments, the NV store 140 may be incorporated into one or more other components of the computing device 102, for example into the I/O subsystem 122.

The computing device 102 may further include one or more peripheral devices 142. The peripheral devices 142 may include any number of additional input/output devices, interface devices, and/or other peripheral devices. For example, in some embodiments, the peripheral devices 142 may include a touch screen, graphics circuitry, an audio device, a microphone, a camera, an environmental sensor, a keyboard, a mouse, and/or other input/output devices, interface devices, and/or peripheral devices.

In embodiments of the system 100 that include one or more advertising servers 104, each advertising server 104 may be configured to provide images such as advertisements to the computing device 102 for display. Each advertising server 104 may provide the advertisements to software executed by the computing device 102, or in some embodiments, each advertising server 104 may communicate directly with the security engine 138. Each advertising server 104 may be embodied as any type of data server or similar computing device capable of performing the functions described herein. As such, an advertising server 104 may include components and features similar to the computing device 102, such as a processor, I/O subsystem, memory, data storage, communication circuitry, and various peripheral devices, which are not illustrated in FIG. 1 for clarity of the present description. Further, each advertising server 104 may be embodied as a single server computing device or a collection of servers and associated devices. For example, in some embodiments, an advertising server 104 may be embodied as a cloud service to perform the functions described herein. In such embodiments, the advertising server 104 may be embodied as a "virtual server" formed from multiple computing devices distributed across the network 106 and operating in a public or private cloud. Accordingly, although the advertising server 104 is illustrated in FIG. 1 and described below as embodied as single server computing device, it should be appreciated that the advertising server 104 may be embodied as multiple devices cooperating together to facilitate the functionality described below.

As discussed in more detail below, the computing device 102 and the advertising servers 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
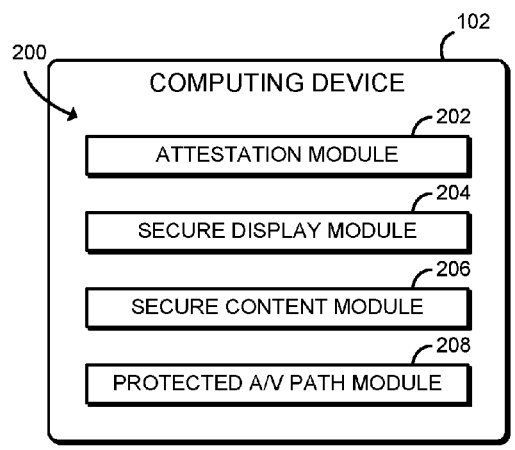
FIG. 2 is a simplified block diagram of at least one embodiment of an environment of the computing device of FIG. 1.

Referring now to FIG. 2, in an illustrative embodiment, the computing device 102 establishes an environment 200 during operation. The illustrative environment 200 includes an attestation module 202, a secure display module 204, a secure content module 206, and a protected audio/video path module 208. The various modules of the environment 200 may be embodied as hardware, firmware, software, or a combination thereof. As such, in some embodiments, one or more of the modules of the environment 200 may be embodied as circuitry or collection of electrical devices (e.g., attestation circuitry 202, secure display circuitry 204, secure content circuitry 206, and/or protected audio/video path circuitry 208). It should be appreciated that, in such embodiments, one or more of the attestation circuitry 202, the secure display circuitry 204, the secure content circuitry 206, and/or the protected audio/video path circuitry 208 may form a portion of one or more of the processor 120, the I/O subsystem 122, the display controller 132, the display 134, and/or other components of the computing device 102. Additionally, in some embodiments, one or more of the illustrative modules may form a portion of another module and/or one or more of the illustrative modules may be independent of one another.

The attestation module 202 is configured to establish a secure, attested communication session between the display controller 132 and the display 134. The attestation module 202 may be configured to perform a secure key exchange between the display controller 132 and the display 134 to establish a shared session key. The attestation module 202 may be configured to attest to an origin of the display controller 132 using a private key provisioned to the computing device 102 and/or to attest to an origin of the display 134 using a private key provisioned to the display 134. The private key may be embodied as an enhanced privacy identifier (EPID) key.

The secure display module 204 is configured to transmit encrypted frame data from the display controller 132 to the display 134 in response to establishment of the secure, attested communication session. The secure display module 204 is further configured to decrypt, by the display 134, the encrypted frame data to generate frame data and display the frame data with the display 134. The secure display module 204 may be further configured to transmit one or more commands from the display controller 132 to the display device 134 via a secure control channel of the secure attested communication session. The secure display module 204 may be configured to disable a read back capability of the self-refresh frame buffer 136 of the display 134 in response to receiving a command to disable read back of the self-refresh frame buffer 136. The secure display module 204 may be configured to clear the contents of the self-refresh frame buffer 136 of the display 134 in response to receiving a command to clear the contents of the self-refresh frame buffer 136.

The secure content module 206 is configured to transmit a predefined image frame from a secure storage of the computing device 102 to the display 134 via the secure, attested communication session in response to termination of the secure, attested communication session. The predefined image frame may include an advertisement and/or user-defined content. Transmitting the predefined image frame from the secure storage may include transmitting the predefined image from secure storage associated with a trusted execution environment of the computing device 102 such as the security engine 138.

The protected audio/video path module 208 is configured to transmit frame data from a trusted execution environment of the computing device 102 to the processor graphics 130 and to transmit the frame data from the processor graphics 130 to the display controller 132. The frame data is cryptographically protected during transmission between the trusted execution environment, the processor graphics 130, and the display controller 132.

Figure 3:
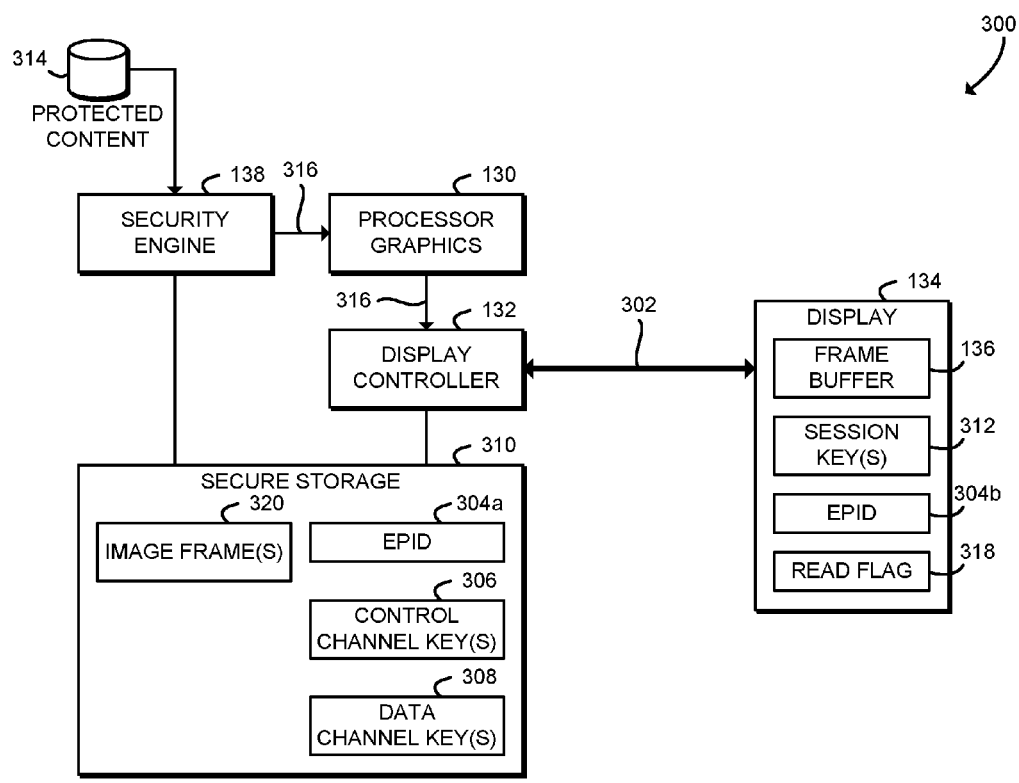
FIG. 3 is a schematic diagram illustrating at least one embodiment of a secure display session established by the computing device of FIGS. 1 and 2.

Referring now to FIG. 3, schematic diagram 300 illustrates one potential embodiment of the secure, attested communication session. In the diagram 300, a secure, attested communication session 302 is illustrated between the display controller 132 and the display 134. The session 302 may support secure communications of control commands as well as frame data between the display controller 132 and the display 134. In the illustrative embodiment, the session 302 is attested to using an EPID key 304a provisioned to the display controller 132 and an EPID key 304b provisioned to the display 134. Each of the EPID keys 304a, 304b may be used to attest to the identity and/or authenticity of the corresponding display controller 132 or display 134. The EPID keys 304a, 304b may be provisioned to the corresponding display controller 132 or display 134 during manufacture. Thus, attestation using the EPID keys 304a, 304b may verify that the display controller 132 and the display 134 were authorized to be integrated.

Communication over the session 302 may be protected by one or more session keys. In particular, control channel communications may be protected by one or more control channel keys 306, and data channel communications may be protected by one or more data channel keys 308. As shown, the EPID key 304a, the control channel keys 306, and the data channel keys 308 are stored in secure storage 310. The secure storage 310 may be embodied, for example, as a secure partition of the NV store 140 that is dedicated to the security engine 138. Additionally or alternatively, in some embodiments one or more of the keys 304a, 306, 308 may be stored in different secure storage locations, including within the data storage device 126. As shown, the display 134 also maintains one or more session keys 312 used to protect the data communication. The session keys 312 and/or the EPID 304b may be stored in one or more non-volatile memory locations of the display 134. In some embodiments, the session keys 312 may be the same as the control channel keys 306 and/or the data channel keys 308.

The schematic diagram 300 further illustrates secure playback of sensitive content. As shown, protected content 314 may be read by the security engine 138. The protected content 314 may be embodied as encrypted frame data or other encrypted media, including digital rights management (DRM) protected video and/or audio files. The protected content 314 may be downloaded to the computing device 102 via the network 106. Software of the computing device 102 (e.g., an A/V player application, framework, or associated drivers) may provide the protected content 314 to the security engine 138. The security engine 138 may access the protected content 314 using one or more encryption keys stored in the secure storage 310. The security engine 138 may securely transmit the protected content 314 to the processor graphics 130 using a protected audio/video path (PAVP) 416. The PAVP 416 may be embodied as any A/V path encrypted or otherwise protected by hardware from access by unauthorized software of the computing device 102. In some embodiments, the protected content 314 may be decrypted by the security engine 138 and then re-encrypted for transmission via the PAVP 316. The processor graphics 130 processes the protected content 314 to generate frame data for output to the display 134, for example performing hardware-accelerated video decoding or other media processing tasks. The processor graphics 130 outputs the frame data via the PAVP 316 to the display controller 132. The frame data is re-encrypted for transmission to the display controller 132. As described further below, the display controller 132 transmits the frame data to the display 134 via the secure communication session 302, which is also encrypted. Thus, the protected content 314 may remain protected over the entire processing and output path from the security engine 138 to the display 134.

Additionally, the diagram 300 illustrates protection of the contents of the frame buffer 136. As shown, the display 134 may include a read flag 318. The read flag 318 may be embodied as a control register that indicates whether the read back capability of the display 134 is enabled. If enabled, the display 134 may allow the display controller 132 or another device to read back the contents of the frame buffer 136, for example over a physical link such as DSI and/or an external HDMI connection. If disabled, the display 134 may deny access to the frame buffer 136. The diagram 300 additionally illustrates that one or more image frames 320 may be stored in the secure storage 310. The image frames 320 may include alternative image content such as screen savers, user-defined content, advertisements, or other image data. As described further below, upon teardown of the secure communication session 302, the computing device 102 may append one or more of the image frames 320 to the display queue of the display controller 132. Those image frames 320 are then transmitted to the display 134 via the secure communication session 302. The image frames 320 are stored in the frame buffer 136, overwriting its previous contents.

Figure 4:
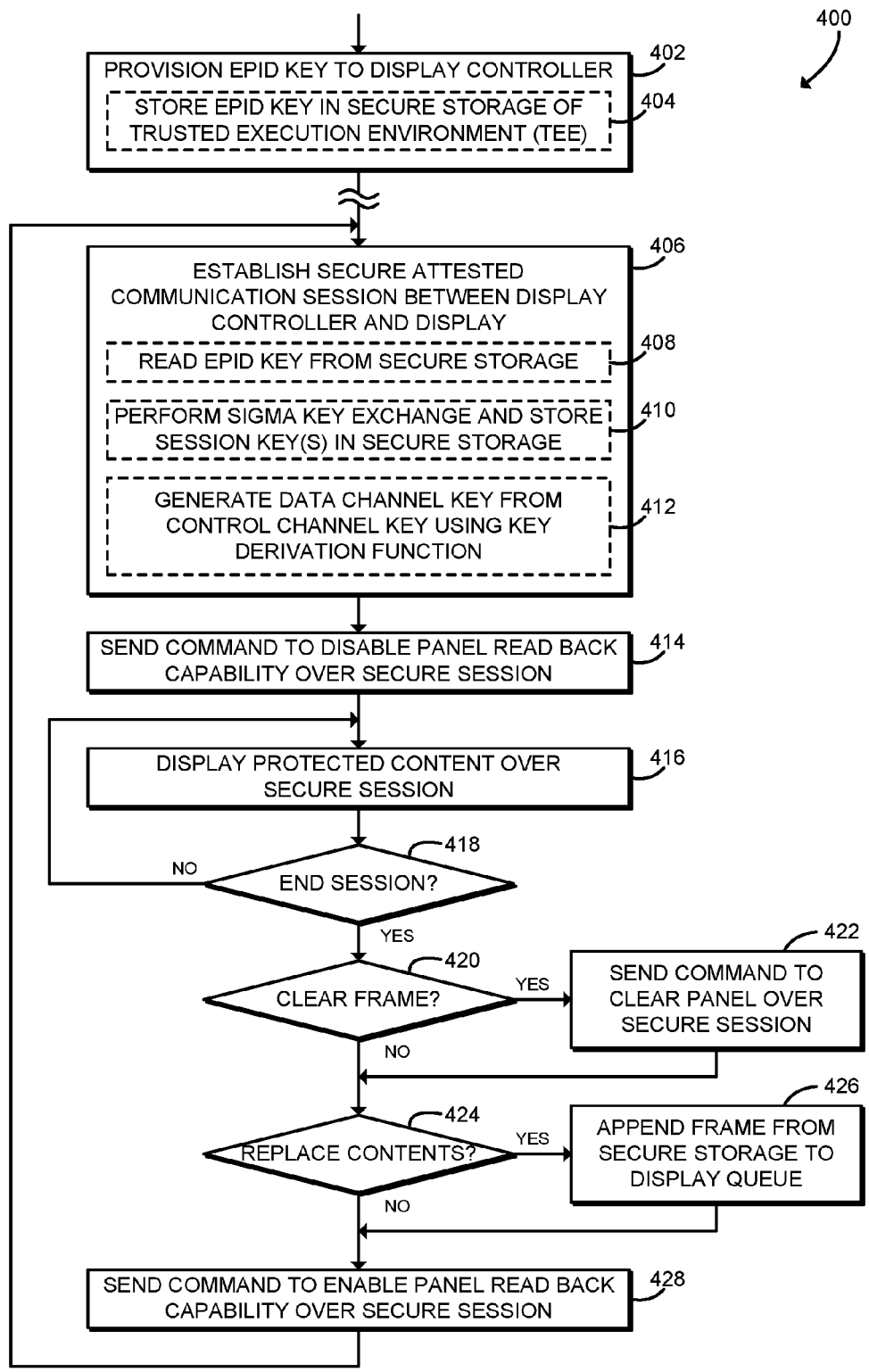
FIG. 4 is a simplified flow diagram of at least one embodiment of a method for secure content display with panel self-refresh that may be executed by the computing device of FIGS. 1 and 2.

Referring now to FIG. 4, in use, the computing device 102 may execute a method 400 for secure content display. The method 400 begins in block 402, in which the computing device 102 provisions an enhanced privacy identifier (EPID) key 304a to the display controller 132. The EPID key 304a may be embodied as a private cryptographic key that is part of a group of private keys associated with a single group public key. Each unique EPID private key may be used to generate a signature that may be verified using the group public key. Thus, the EPID key 304a may be used for anonymous authentication. As described further below, the EPID key 304a may be used by the display controller 132 to attest to its capabilities and origin when establishing a secure communication session 302 with the display 134. The manufacturer may use any appropriate technique to securely provision the EPID key 304a to the display controller 132. For example, the EPID key 304a may be provisioned to the display controller 132 during manufacture and/or integration of the display controller 132 or the computing device 102. In some embodiments, the EPID key 304a may be securely provisioned to the display controller 132 at a different time, for example when the computing device 102 is initially configured for use. Additionally, although illustrated as an EPID key, it should be understood that in other embodiments the display controller 132 may be provisioned with any private key, certificate, or other data that may be used to attest to the identity and/or authenticity of the display controller 132. In some embodiments, in block 404 the EPID key 304a may be stored in secure storage 310 dedicated to a trusted execution environment (TEE) of the computing device 102. For example, in the illustrative embodiment, the EPID key 304a may be provisioned to a partition of the NV store 140 that is dedicated to the security engine 138. After provisioning the EPID key 304a to the display controller 132, the computing device 102 may be sold, provisioned, or otherwise distributed to an end user.

In block 406, the computing device 102 establishes a secure, attested communication session 302 between the display controller 132 and the display 134. The computing device 102 may perform any secure key exchange or handshake protocol that verifies the identity and/or authenticity of the display controller 132 and the display 134. Attestation may prevent an unauthorized display 134 from being integrated with the computing device 102 during manufacture, and may allow unauthorized replacement of the display 134 to be detected. After being established, the secure, attested communication session 302 cryptographically protects data and control commands exchanged over the physical connection between the display controller 132 and the display 134. For example, the secure, attested communication session 302 may protect data and control commands exchanged over a DSI connection between the display controller 132 and the display 134. Thus, the secure, attested communication session 302 may protect the "last inch" of the display pipeline for the computing device 102.

In some embodiments, in block 408 the computing device 102 may read the EPID key 304a from secure storage 310. In particular, the security engine 138 and/or the display controller 132 may read the EPID key 304a from the secure partition of the NV store 140 dedicated to the security engine 138. The EPID key 304a may be used to attest to the identity and/or authenticity of the display controller 132. In some embodiments, in block 410, the computing device 102 may perform a secure key exchange between the display controller 132 and the display 134 to exchange one or more shared session keys. The computing device 102 may perform any secure key exchange protocol, including a SIGMA key exchange, a Diffie-Hellman key exchange, Password Authenticated Key Exchange (PAKE), and/or other secure key exchange. A shared session key may be embodied as a symmetric key used to protect data and/or control commands exchanged between the display controller 132 and the display 134. In particular, the shared session keys may include control channel key(s) 406 to protect exchanged control commands and/or data channel key(s) 408 to protect exchanged data. Thus, in those embodiments, the secure, attested communication session 302 may include both a control channel and a data channel. The shared session key(s) may be stored in secure storage 310, such as the secure partition of the NV store 140 dedicated to the security engine 138. In some embodiments, in block 412 the computing device 102 may generate a data channel key 308 as a function of a control channel key 306 using a key derivation function. The control channel key 306 may be obtained, for example, as a result of the Diffie-Hellman key exchange described above in connection with block 410.

Referring back to FIG. 4, after establishing the secure communication session 302, in block 414 the computing device 102 sends a command to disable a panel read back capability over the secure communication session 302 from the display controller 132 to the display 134. In response to receiving the command, the display 134 disables the panel read back capability. When the read back capability is disabled, the display 134 does not allow other entities (e.g., the display controller 132 and/or external display devices) to read the contents of its internal frame buffer 136. Thus, by disabling panel read back, the computing device 102 may prevent unauthorized access to the contents of the frame buffer 136. Additionally or alternatively, in some embodiments, the display 134 may encrypt the contents of the frame buffer 136 on read back, which would allow only an authorized entity in possession of the appropriate decryption key to read the contents of the frame buffer 136. The command to disable the panel read back capability may be sent via a secure control channel of the secure communication session 302, for example by being encrypted by one or more control channel keys 306. The command to disable the panel read back capability may originate from software executed by the computing device 102 (e.g., application software, device driver software, and/or operating system software).

In block 416, after disabling panel read back, the computing device 102 displays protected frame data over the secure communication session 302. In particular, frame data is transmitted from the display controller 132 to the display 134 to be displayed. The frame data may be sent via a secure data channel of the secure communication session 302, for example by being encrypted by one or more data channel keys 308. After receiving the encrypted frame data, the display 134 may decrypt the encrypted frame data, store the decrypted frame data in the frame buffer 136, and output the decrypted frame data (e.g., by displaying the frame to a user). Thus, the frame data may be stored in plaintext (i.e., in the clear) in the frame buffer 136. As described above, because the panel read back capability has been disabled, the display 134 does not output the plaintext contents of the frame buffer 136 back to the display controller 132 or to other entities. Thus, in some embodiments, the secure communication session 302 may be the last link in a protected audio/video path 316 that cryptographically protects protected content 314 as it is being processed by the computing device 102.

After displaying the protected frame data, in block 418 the computing device 102 determines whether to end the secure communication session 302. The computing device 102 may end the secure communication session 302 in response to any appropriate event, such as a software command to tear down or otherwise terminate the session 302. If the computing device 102 determines not to end the secure communication session 302, the method 400 loops back to block 416, in which the computing device 102 continues to display protected frame data over the secure communication session 302. If the computing device 102 determines to end the secure communication session 302, the method 400 advances to block 420.

In block 420, the computing device 102 determines whether to clear the contents of the frame buffer 136. The determination of whether to clear the contents may be preconfigured, or in some embodiments the computing device 102 may determine whether to clear the contents based on a security policy. If the computing device 102 determines not to clear the contents of the frame buffer 136, the method 400 advances to block 424, described below. If the computing device 102 determines to clear the contents of the frame buffer 136, the method 400 branches to block 422.

In block 422 the computing device 102 sends a command to clear the frame buffer 136 over the secure communication session 302 from the display controller 132 to the display 134. In response to receiving the command, the display 134 clears the frame buffer 136. The display 134 may use any appropriate technique to clear the frame buffer 136, including zeroing the frame buffer 136, replacing the frame buffer 136 with data corresponding to a solid color (e.g., black or white), replacing the frame buffer 136 with random data, or otherwise clearing the frame buffer 136. After being cleared, the frame buffer 136 no longer contains sensitive data such as frames of protected content 314. The command to clear the frame buffer 136 may be sent via a secure control channel of the secure communication session 302, for example by being encrypted by one or more control channel keys 306. The command to clear the frame buffer 136 may originate from software executed by the computing device 102 (e.g., application software, device driver software, and/or operating system software). After clearing the frame buffer 136, the method 400 advances to block 424.

In block 424, the computing device 102 determines whether to replace the contents of the frame buffer 136 with alternative image content 320. The determination of whether to replace the contents of the frame buffer 136 may be preconfigured or in some embodiments may be based on a security policy. If the computing device 102 determines not to replace the frame buffer 136 contents, the method 400 advances to block 428, described below. If the computing device 102 determines to replace the contents of the frame buffer 136, the method 400 branches to block 426.

In block 426, the computing device 102 appends a frame of the alternative image content 320 from secure storage 310 to the display queue of the display controller 132. The alternative image content 320 may be appended to the display queue directly following a frame of the protected content 314. After being appended, the display controller 132 transmits the frame of alternative image content 320 to the display 134 over the secure communication session 302. The display 134 stores the frame in the frame buffer 136, overwriting the previous contents of the frame buffer 136, and then displays the alternative image content 320. By overwriting the contents of the frame buffer 136, the alternative image content 320 may prevent leaking of sensitive data such as frames of protected content 314. By being appended to the display queue, the alternative image content 320 may be displayed immediately by the display 134 without any glitches, visual discontinuities, or other visual artifacts. As described above, the alternative image content 320 may be embodied as, for example, user-defined content, a screen saver, an advertisement, or other image. The alternative image content 320 may be stored in secure storage 310 such as a secure partition of the NV store 140 dedicated to the security engine 138, or in a secure location within the data storage device 126. Although illustrated as using the security engine 138, it should be understood that in some embodiments the secure storage may be associated with any other trusted execution environment of the computing device 100. For example, the trusted execution environment may be protected by trusted execution support of the processor 120 such as Intel® Software Guard Extensions (SGX) technology, Intel® Trusted Execution Technology (TXT), ARM® TrustZone™, a firmware trusted platform module (TPM), or other trusted execution support. In some embodiments, the alternative image content 320 may be selected from a number of advertisements, which may be downloaded from or otherwise provided by one or more of the advertising servers 104. Note that because the alternative image content 320 is transmitted over the secure communication session 302 and the read back capability remains disabled, the alternative image content 320 may also be protected from unauthorized access. After displaying the alternative image content 320, the method 400 advances to block 428.

In block 428, the computing device 102 sends a command to enable the panel read back capability over the secure communication session 302 from the display controller 132 to the display 134. In response to receiving the command, the display 134 enables the panel read back capability. When the read back capability is enabled, the display 134 may allow other entities (e.g., the display controller 132 and/or external display devices) to read the contents of its internal frame buffer 136. The command to enable the panel read back capability may be sent via the secure control channel of the secure communication session 302, for example being encrypted by one or more control channel keys 306. The command to enable the panel read back capability may originate from software executed by the computing device 102 (e.g., application software, device driver software, and/or operating system software). After enabling panel read back, the method 400 loops back to block 406, in which another secure communication session 302 may be established.

Although illustrated as enabling panel read back immediately after displaying the alternative image content 320, it should be understood that in some embodiments those functions may be performed in a different order and/or at different times. For example, in some embodiments, the computing device 102 may replace the contents of the frame buffer 136 and/or clear the frame buffer 136 after a certain amount of time has elapsed, and in some embodiments the computing device 102 may clear the frame buffer 136 after displaying the alternative image content 320.

Figure 5:
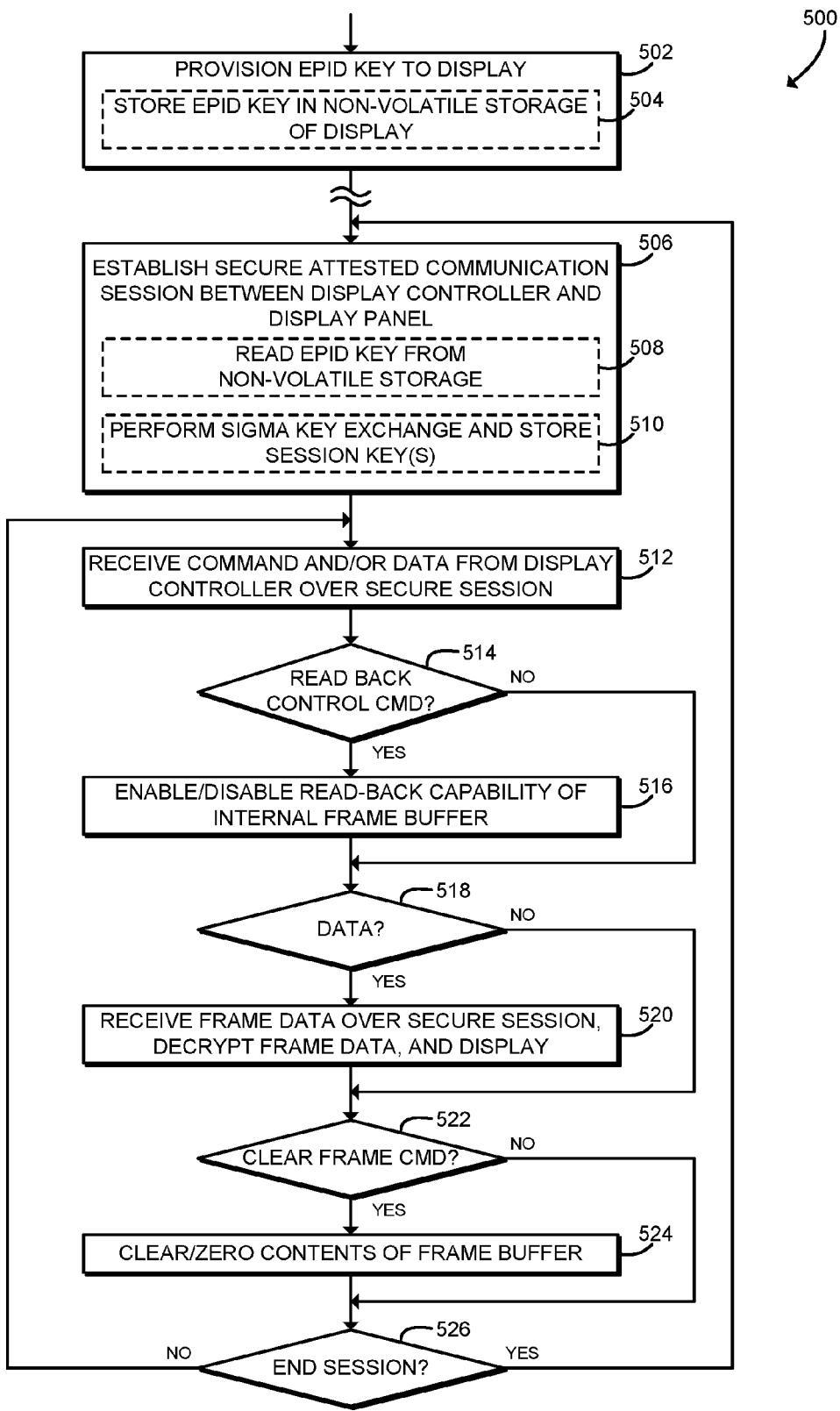
FIG. 5 is a simplified flow diagram of at least one embodiment of a method for secure content display with panel self-refresh that may be executed by a display device of FIGS. 1 and 2.

Referring now to FIG. 5, in use, the display 134 may execute a method 500 for secure content display. The method 500 begins in block 502, in which an enhanced privacy identifier (EPID) key 304b is provisioned to the display 134. As described above, the EPID key 304b may be embodied as a private cryptographic key that is part of a group of private keys associated with a single group public key. Each unique EPID private key may be used to generate a signature that may be verified using the group public key. Thus, the EPID key 304b may be used for anonymous authentication. As described further below, the EPID key 304b may be used by the display 134 to attest to its identity when establishing a secure communication session 302 with the display controller 132. The manufacturer may use any appropriate technique to securely provision the EPID key 304b to the display 134. For example, the EPID key 304b may be provisioned to the display 134 during manufacture of the display 134 and/or during integration of the display 134 and the computing device 102. Additionally, although illustrated as an EPID key, it should be understood that in other embodiments the display 134 may be provisioned with any private key, certificate, or other data that may be used to attest to the identity and/or authenticity of the display 134. In some embodiments, in block 504, the EPID key 304b may be stored in non-volatile storage of the display 134.

In block 506, the display 134 establishes a secure, attested communication session 302 between the display controller 132 and the display 134. The display 134 may perform any secure key exchange or handshake protocol that verifies the identity and/or authenticity of the display controller 132 and the display 134. After being established, the secure, attested communication session 302 cryptographically protects data and control commands exchanged over the physical connection between the display controller 132 and the display 134. For example, the secure, attested communication session 302 may protect data and control commands exchanged over a DSI connection between the display controller 132 and the display 134.

In some embodiments, in block 508 the display 134 may read the EPID key 304b from non-volatile storage of the display 134. The EPID key 304b may be used to attest to the identity and/or authenticity of the display 134. In some embodiments, in block 510, the display 134 may perform a secure key exchange between the display controller 132 and the display 134 to exchange one or more shared session keys 312. The display 134 may perform any secure key exchange protocol, including a SIGMA key exchange, a Diffie-Hellman key exchange, PAKE, and/or other secure key exchange. A shared session key 312 may be embodied as a symmetric key used to protect data and/or control commands exchanged between the display controller 132 and the display 134. In particular, the shared session keys 312 may include data channel key(s) to protect exchanged data and/or control channel key(s) to protect exchanged control commands Thus, in those embodiments the secure, attested communication session 302 may include both a control channel and a data channel. The shared session key(s) 412 may be stored in the non-volatile storage of the display 134. In some embodiments, the computing device 102 may generate a data channel key as a function of a control channel key using a key derivation function.

In block 512, the display 134 receives commands and/or data from the display controller 132 over the secure communication session 302. The commands and data received over the secure communication session 302 are encrypted with the previously exchanged shared session key(s) 412. As described further below, the data received over the secure communication session 302 may include frames for output to the display 134. Control commands may include commands to enable or disable a panel read back capability, commands to clear the frame buffer 136, and/or other control commands.

In block 514, the display 134 determines whether a command to enable or disable the panel read back capability has been received. If not, the method 500 branches ahead to block 518. If a command to enable or disable the panel read back capability has been received, the method 500 advances to block 516, in which the display 134 enables or disables the panel read back capability based on the received command. For example, the display 134 may set the read flag 318 to indicate whether the panel read back capability is enabled. When the read back capability is enabled, the display 134 may allow other entities (e.g., the display controller 132 and/or external display devices) to read the contents of its internal frame buffer 136. When the read back capability is disabled, the display 134 does not allow other entities (e.g., the display controller 132 and/or external display devices) to read the contents of its internal frame buffer 136. Additionally or alternatively, in some embodiments, when the panel read back capability is disabled, the display 134 may encrypt the contents of the frame buffer 136 on read back, which would allow only an authorized entity in possession of the appropriate decryption key to read the contents of the frame buffer 136.

In block 518, the display 134 determines whether data has been received. If not, the method 500 branches ahead to block 522. If data has been received, the method 500 advances to block 520, in which the display 134 receives encrypted frame data from the display controller 132 over the secure communication session 302, decrypts the encrypted frame data, and displays or otherwise outputs the decrypted frame data. The display 134 stores the frame data in the frame buffer 136 in plaintext (i.e., in the clear). The frame data output by the display 134 may include protected content 314 as described above in connection with block 416 of FIG. 4 and/or alternative image content 320 as described above in connection with block 426 of FIG. 4.

In block 522, the display 134 determines whether a command to clear the contents of the frame buffer 136 has been received. If not, the method 500 branches ahead to block 526. If a command to clear the contents of the frame buffer 136 has been received, the method 500 advances to block 524, in which the display 134 clears or otherwise zeros the contents of the frame buffer 136. The display 134 may use any appropriate technique to clear the frame buffer 136, including zeroing the frame buffer 136, replacing the frame buffer 136 with data corresponding to a solid color (e.g., black or white), replacing the frame buffer 136 with random data, or otherwise clearing the frame buffer 136. After being cleared, the frame buffer 136 no longer contains sensitive data such as frames of protected content 314.

In block 526, the display 134 determines whether to end the secure communication session 302. The display 134 may use any appropriate technique to determine whether to end the secure communication session 302. For example, the display 134 may end the secure communication session 302 in response to a control command received from the display controller 132. If the display 134 determines not to end the secure communication session 302, the method 500 loops back to block 512 to continue receiving data and/or commands. If the display 134 determines to end the secure communication session 302, the method 500 loops back to block 506, in which the display 134 may establish additional secure communication sessions 302.

It should be appreciated that, in some embodiments, the methods 400 and/or 500 may be embodied as various instructions stored on a computer-readable media, which may be executed by the processor 120, the display controller 132, the display 134, and/or other components of the computing device 102 to cause the computing device 102 to perform the corresponding method 400 and/or 500. The computer-readable media may be embodied as any type of media capable of being read by the computing device 102 including, but not limited to, the memory 124, the data storage device 126, a local memory of the processor 120, other memory or data storage devices of the computing device 102, portable media readable by a peripheral device 142 of the computing device 102, and/or other media.

EXAMPLES

Illustrative examples of the technologies disclosed herein are provided below. An embodiment of the technologies may include any one or more, and any combination of, the examples described below.

Example 1 includes a computing device for secure image display, the computing device comprising a display controller; an attestation module to establish a secure, attested communication session between the display controller and a display device; and a secure display module to transmit encrypted frame data from the display controller to the display device in response to establishment of the secure, attested communication session.

Example 2 includes the subject matter of Example 1, and wherein to establish the secure, attested communication session comprises to perform a secure key exchange between the display controller and the display device to establish a shared session key; and to transmit the encrypted frame data comprises to transmit encrypted frame data that is protected by the shared session key.

Example 3 includes the subject matter of any of Examples 1 and 2, and wherein to perform the secure key exchange comprises to generate a data channel key as a function of the shared session key with a key derivation function.

Example 4 includes the subject matter of any of Examples 1-3, and wherein to establish the secure, attested communication session comprises to attest to an origin of the display controller using a private key provisioned to the computing device.

Example 5 includes the subject matter of any of Examples 1-4, and wherein the private key comprises an enhanced privacy identifier (EPID) key provisioned to a secure storage of the computing device.

Example 6 includes the subject matter of any of Examples 1-5, and wherein the secure display module is further to transmit a command from the display controller to the display device via a secure control channel of the secure attested communication session, wherein the command comprises a command to disable read back of a self-refresh frame buffer of the display device.

Example 7 includes the subject matter of any of Examples 1-6, and wherein the secure display module is further to transmit a command from the display controller to the display device via a secure control channel of the secure, attested communication session, wherein the command comprises a command to clear contents of a self-refresh frame buffer of the display device.

Example 8 includes the subject matter of any of Examples 1-7, and further comprising a secure content module to transmit a predefined image frame from a secure storage of the computing device to the display device via the secure, attested communication session in response to termination of the secure, attested communication session, wherein the display device comprises a self-refresh frame buffer.

Example 9 includes the subject matter of any of Examples 1-8, and wherein to transmit the predefined image frame to the display device comprises to append the predefined image frame to a display queue of the display controller.

Example 10 includes the subject matter of any of Examples 1-9, and wherein the predefined image frame comprises an advertisement.

Example 11 includes the subject matter of any of Examples 1-10, and wherein the predefined image frame comprises user-defined content.

Example 12 includes the subject matter of any of Examples 1-11, and wherein to transmit the predefined image frame from the secure storage comprises to transmit the predefined image from secure storage associated with a trusted execution environment of the computing device.

Example 13 includes the subject matter of any of Examples 1-12, and further comprising a converged security and manageability engine, wherein the converged security and manageability engine comprises the trusted execution environment.

Example 14 includes the subject matter of any of Examples 1-13, and further comprising a processor having trusted execution support, wherein the processor protects the trusted execution environment with the trusted execution support.

Example 15 includes the subject matter of any of Examples 1-14, and further comprising a protected audio/video path module to (i) transmit frame data from a trusted execution environment of the computing device to a processor graphics of the computing device, wherein transmission of the frame data is cryptographically protected, and (ii) transmit the frame data from the processor graphics to the display controller, wherein transmission of the frame data is cryptographically protected; wherein the secure display module is further to encrypt, by the display controller, the frame data to generate the encrypted frame data; and wherein to transmit the encrypted frame data from the display controller to the display device comprises to transmit the encrypted frame data in response to encryption of the frame data.

Example 16 includes the subject matter of any of Examples 1-15, and further comprising a converged security and manageability engine, wherein the converged security and manageability engine comprises the trusted execution environment.

Example 17 includes a display device for secure image display, the display device comprising an attestation module to establish a secure, attested communication session between the display device and a display controller of a computing device; and a secure display module to (i) receive encrypted frame data from the display controller in response to establishment of the secure, attested communication session, (ii) decrypt the encrypted frame data to generate frame data, and (iii) display the frame data.

Example 18 includes the subject matter of Example 17, and wherein to establish the secure, attested communication session comprises to perform a secure key exchange between the display device and the display controller to establish a shared session key; and to receive the encrypted frame data comprises to receive encrypted frame data that is protected by the shared session key.

Example 19 includes the subject matter of any of Examples 17 and 18, and wherein to establish the secure, attested communication session comprises to attest to an origin of the display device using a private key provisioned to the display device.

Example 20 includes the subject matter of any of Examples 17-19, and wherein the private key comprises an enhanced privacy identifier (EPID) key provisioned to the display device.

Example 21 includes the subject matter of any of Examples 17-20, and further comprising a self-refresh frame buffer, wherein the secure display module is further to receive a command from the display controller via a secure control channel of the secure attested communication session, wherein the command comprises a command to disable read back of the self-refresh frame buffer; and disable a read back capability of the self-refresh frame buffer in response to receipt of the command from the display controller.

Example 22 includes the subject matter of any of Examples 17-21, and further comprising a self-refresh frame buffer, wherein the secure display module is further to receive a command from the display controller via a secure control channel of the secure attested communication session, wherein the command comprises a command to clear contents of the self-refresh frame buffer; and clear the contents of the self-refresh frame buffer in response to receipt of the command from the display controller.

Example 23 includes a method for secure image display, the method comprising establishing, by a computing device, a secure, attested communication session between a display controller of the computing device and a display device; and transmitting, by the computing device, encrypted frame data from the display controller to the display device in response to establishing the secure, attested communication session.

Example 24 includes the subject matter of Example 23, and wherein establishing the secure, attested communication session comprises performing a secure key exchange between the display controller and the display device to establish a shared session key; and transmitting the encrypted frame data comprises transmitting encrypted frame data that is protected by the shared session key.

Example 25 includes the subject matter of any of Examples 23 and 24, and wherein performing the secure key exchange comprises generating a data channel key as a function of the shared session key using a key derivation function.

Example 26 includes the subject matter of any of Examples 23-25, and wherein establishing the secure, attested communication session comprises attesting to an origin of the computing device using a private key provisioned to the computing device.

Example 27 includes the subject matter of any of Examples 23-26, and wherein the private key comprises an enhanced privacy identifier (EPID) key provisioned to a secure storage of the computing device.

Example 28 includes the subject matter of any of Examples 23-27, and further comprising transmitting, by the computing device, a command from the display controller to the display device via a secure control channel of the secure attested communication session, wherein the command comprises a command to disable read back of a self-refresh frame buffer of the display device.

Example 29 includes the subject matter of any of Examples 23-28, and further comprising transmitting, by the computing device, a command from the display controller to the display device via a secure control channel of the secure, attested communication session, wherein the command comprises a command to clear contents of a self-refresh frame buffer of the display device.

Example 30 includes the subject matter of any of Examples 23-29, and further comprising transmitting, by the computing device, a predefined image frame from a secure storage of the computing device to the display device via the secure, attested communication session in response to termination of the secure, attested communication session, wherein the display device comprises a self-refresh frame buffer.

Example 31 includes the subject matter of any of Examples 23-30, and wherein transmitting the predefined image frame to the display device comprises appending the predefined image frame to a display queue of the display controller.

Example 32 includes the subject matter of any of Examples 23-31, and wherein the predefined image frame comprises an advertisement.

Example 33 includes the subject matter of any of Examples 23-32, and wherein the predefined image frame comprises user-defined content.

Example 34 includes the subject matter of any of Examples 23-33, and wherein transmitting the predefined image frame from the secure storage comprises transmitting the predefined image from secure storage associated with a trusted execution environment of the computing device.

Example 35 includes the subject matter of any of Examples 23-34, and wherein the trusted execution environment comprises a converged security and manageability engine of the computing device.

Example 36 includes the subject matter of any of Examples 23-35, and further comprising protecting, by the computing device, the trusted execution environment with trusted execution support of a processor of the computing device.

Example 37 includes the subject matter of any of Examples 23-36, and further comprising transmitting, by the computing device, frame data from a trusted execution environment of the computing device to a processor graphics of the computing device, wherein transmission of the frame data is cryptographically protected; transmitting, by the computing device, the frame data from the processor graphics to the display controller, wherein transmission of the frame data is cryptographically protected; and encrypting, by the display controller, the frame data to generate the encrypted frame data; wherein transmitting the encrypted frame data from the display controller to the display device comprises transmitting the encrypted frame data in response to encrypting the frame data.

Example 38 includes the subject matter of any of Examples 23-37, and wherein the trusted execution environment comprises a converged security and manageability engine of the computing device.

Example 39 includes a method for secure image display, the method comprising establishing, by a display device, a secure, attested communication session between the display device and a display controller of a computing device; receiving, by the display device, encrypted frame data from the display controller in response to establishing the secure, attested communication session; decrypting, by the display device, the encrypted frame data to generate frame data; and displaying, by the display device, the frame data.

Example 40 includes the subject matter of Example 39, and wherein establishing the secure, attested communication session comprises performing a secure key exchange between the display device and the display controller to establish a shared session key; and receiving the encrypted frame data comprises receiving encrypted frame data that is protected by the shared session key.

Example 41 includes the subject matter of any of Examples 39 and 40, and wherein establishing the secure, attested communication session comprises attesting to an origin of the display device using a private key provisioned to the display device.

Example 42 includes the subject matter of any of Examples 39-41, and wherein the private key comprises an enhanced privacy identifier (EPID) key provisioned to the display device.

Example 43 includes the subject matter of any of Examples 39-42, and further comprising receiving, by the display device, a command from the display controller via a secure control channel of the secure attested communication session, wherein the command comprises a command to disable read back of a self-refresh frame buffer of the display device; and disabling, by the display device, a read back capability of the self-refresh frame buffer in response to receiving the command from the display controller.

Example 44 includes the subject matter of any of Examples 39-43, and further comprising receiving, by the display device, a command from the display controller via a secure control channel of the secure attested communication session, wherein the command comprises a command to clear contents of a self-refresh frame buffer of the display device; and clearing, by the display device, the contents of the self-refresh frame buffer in response to receiving the command from the display controller.

Example 45 includes a computing device comprising a processor; and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device comprising means for performing the method of any of Examples 23-44.

Example 48 includes a computing device for secure image display, the computing device comprising means for establishing a secure, attested communication session between a display controller of the computing device and a display device; and means for transmitting encrypted frame data from the display controller to the display device in response to establishing the secure, attested communication session.

Example 49 includes the subject matter of Example 48, and wherein the means for establishing the secure, attested communication session comprises means for performing a secure key exchange between the display controller and the display device to establish a shared session key; and the means for transmitting the encrypted frame data comprises means for transmitting encrypted frame data that is protected by the shared session key.

Example 50 includes the subject matter of any of Examples 48 and 49, and wherein the means for performing the secure key exchange comprises means for generating a data channel key as a function of the shared session key using a key derivation function.

Example 51 includes the subject matter of any of Examples 48-50, and wherein the means for establishing the secure, attested communication session comprises means for attesting to an origin of the computing device using a private key provisioned to the computing device.

Example 52 includes the subject matter of any of Examples 48-51, and wherein the private key comprises an enhanced privacy identifier (EPID) key provisioned to a secure storage of the computing device.

Example 53 includes the subject matter of any of Examples 48-52, and further comprising means for transmitting a command from the display controller to the display device via a secure control channel of the secure attested communication session, wherein the command comprises a command to disable read back of a self-refresh frame buffer of the display device.

Example 54 includes the subject matter of any of Examples 48-53, and further comprising means for transmitting a command from the display controller to the display device via a secure control channel of the secure, attested communication session, wherein the command comprises a command to clear contents of a self-refresh frame buffer of the display device.

Example 55 includes the subject matter of any of Examples 48-54, and further comprising means for transmitting a predefined image frame from a secure storage of the computing device to the display device via the secure, attested communication session in response to termination of the secure, attested communication session, wherein the display device comprises a self-refresh frame buffer.

Example 56 includes the subject matter of any of Examples 48-55, and wherein the means for transmitting the predefined image frame to the display device comprises means for appending the predefined image frame to a display queue of the display controller.

Example 57 includes the subject matter of any of Examples 48-56, and wherein the predefined image frame comprises an advertisement.

Example 58 includes the subject matter of any of Examples 48-57, and wherein the predefined image frame comprises user-defined content.

Example 59 includes the subject matter of any of Examples 48-58, and wherein the means for transmitting the predefined image frame from the secure storage comprises means for transmitting the predefined image from secure storage associated with a trusted execution environment of the computing device.

Example 60 includes the subject matter of any of Examples 48-59, and wherein the trusted execution environment comprises a converged security and manageability engine of the computing device.

Example 61 includes the subject matter of any of Examples 48-60, and further comprising means for protecting the trusted execution environment with trusted execution support of a processor of the computing device.

Example 62 includes the subject matter of any of Examples 48-61, and further comprising means for transmitting frame data from a trusted execution environment of the computing device to a processor graphics of the computing device, wherein transmission of the frame data is cryptographically protected; means for transmitting the frame data from the processor graphics to the display controller, wherein transmission of the frame data is cryptographically protected; and means for encrypting, by the display controller, the frame data to generate the encrypted frame data; wherein the means for transmitting the encrypted frame data from the display controller to the display device comprises means for transmitting the encrypted frame data in response to encrypting the frame data.

Example 63 includes the subject matter of any of Examples 48-62, and wherein the trusted execution environment comprises a converged security and manageability engine of the computing device.

Example 64 includes a display device for secure image display, the display device comprising means for establishing a secure, attested communication session between the display device and a display controller of a computing device; means for receiving encrypted frame data from the display controller in response to establishing the secure, attested communication session; means for decrypting the encrypted frame data to generate frame data; and means for displaying the frame data.

Example 65 includes the subject matter of Example 64, and wherein the means for establishing the secure, attested communication session comprises means for performing a secure key exchange between the display device and the display controller to establish a shared session key; and the means for receiving the encrypted frame data comprises means for receiving encrypted frame data that is protected by the shared session key.

Example 66 includes the subject matter of any of Examples 64 and 65, and wherein the means for establishing the secure, attested communication session comprises means for attesting to an origin of the display device using a private key provisioned to the display device.

Example 67 includes the subject matter of any of Examples 64-66, and wherein the private key comprises an enhanced privacy identifier (EPID) key provisioned to the display device.

Example 68 includes the subject matter of any of Examples 64-67, and further comprising means for receiving a command from the display controller via a secure control channel of the secure attested communication session, wherein the command comprises a command to disable read back of a self-refresh frame buffer of the display device; and means for disabling a read back capability of the self-refresh frame buffer in response to receiving the command from the display controller.

Example 69 includes the subject matter of any of Examples 64-68, and further comprising means for receiving a command from the display controller via a secure control channel of the secure attested communication session, wherein the command comprises a command to clear contents of a self-refresh frame buffer of the display device; and means for clearing the contents of the self-refresh frame buffer in response to receiving the command from the display controller.

The invention claimed is:

1. A computing device for secure image display, the computing device comprising:
   a display controller;
   an attestation module to establish a secure, attested communication session between the display controller and a display device; and
   a secure display module to (i) transmit encrypted frame data from the display controller to the display device in response to establishment of the secure, attested communication session and (ii) transmit a command from the display controller to the display device via a secure control channel of the secure attested communication session, wherein the command comprises a command to disable read back of a self-refresh frame buffer of the display device.

2. The computing device of claim 1, wherein to establish the secure, attested communication session comprises to attest to an origin of the display controller using a private key provisioned to the computing device.

3. The computing device of claim 2, wherein the private key comprises an enhanced privacy identifier (EPID) key provisioned to a secure storage of the computing device.

4. The computing device of claim 1, wherein the secure display module is further to transmit a second command from the display controller to the display device via the secure control channel of the secure, attested communication session, wherein the second command comprises a command to clear contents of the self-refresh frame buffer of the display device.

5. The computing device of claim 1, further comprising a secure content module to transmit a predefined image frame from a secure storage of the computing device to the display device via the secure, attested communication session in response to termination of the secure, attested communication session, wherein the display device comprises the self-refresh frame buffer.

6. The computing device of claim 5, wherein to transmit the predefined image frame to the display device comprises to append the predefined image frame to a display queue of the display controller.

7. The computing device of claim 5, wherein to transmit the predefined image frame from the secure storage comprises to transmit the predefined image from secure storage associated with a trusted execution environment of the computing device.

8. The computing device of claim 7, further comprising a converged security and manageability engine, wherein the converged security and manageability engine comprises the trusted execution environment.

9. The computing device of claim 1, further comprising:
   a protected audio/video path module to (i) transmit frame data from a trusted execution environment of the computing device to a processor graphics of the computing device, wherein transmission of the frame data is cryptographically protected, and (ii) transmit the frame data from the processor graphics to the display controller, wherein transmission of the frame data is cryptographically protected;
   wherein the secure display module is further to encrypt, by the display controller, the frame data to generate the encrypted frame data; and
   wherein to transmit the encrypted frame data from the display controller to the display device comprises to transmit the encrypted frame data in response to encryption of the frame data.

10. The computing device of claim 9, further comprising a converged security and manageability engine, wherein the converged security and manageability engine comprises the trusted execution environment.

11. One or more non-transitory, computer-readable storage media comprising a plurality of instructions that in response to being executed cause a computing device to:
   establish a secure, attested communication session between a display controller of the computing device and a display device;
   transmit encrypted frame data from the display controller to the display device in response to establishing the secure, attested communication session; and
   transmit a command from the display controller to the display device via a secure control channel of the secure attested communication session, wherein the command comprises a command to disable read back of a self-refresh frame buffer of the display device.

12. The one or more non-transitory, computer-readable storage media of claim 11, wherein to establish the secure, attested communication session comprises to attest to an origin of the computing device using a private key provisioned to the computing device.

13. The one or more non-transitory, computer-readable storage media of claim 11, further comprising a plurality of instructions that in response to being executed cause the computing device to transmit a second command from the display controller to the display device via the secure control channel of the secure, attested communication session, wherein the second command comprises a command to clear contents of the self-refresh frame buffer of the display device.

14. The one or more non-transitory, computer-readable storage media of claim 11, further comprising a plurality of instructions that in response to being executed cause the computing device to transmit a predefined image frame from a secure storage of the computing device to the display device via the secure, attested communication session in response to termination of the secure, attested communication session, wherein the display device comprises the self-refresh frame buffer.

15. A display device for secure image display, the display device comprising:
   a self-refresh frame buffer;
   an attestation module to establish a secure, attested communication session between the display device and a display controller of a computing device; and
   a secure display module to (i) receive encrypted frame data from the display controller in response to establishment of the secure, attested communication session, (ii) decrypt the encrypted frame data to generate frame data, (iii) display the frame data, (iv) receive a command from the display controller via a secure control channel of the secure attested communication session, wherein the command comprises a command to disable read back of the self-refresh frame buffer, and (v) disable a read back capability of the self-refresh frame buffer in response to receipt of the command from the display controller.

16. The display device of claim 15, wherein to establish the secure, attested communication session comprises to attest to an origin of the display device using a private key provisioned to the display device.

17. The display device of claim 16, wherein the private key comprises an enhanced privacy identifier (EPID) key provisioned to the display device.

18. The display device of claim 15, wherein the secure display module is further to:
   receive a second command from the display controller via the secure control channel of the secure attested communication session, wherein the second command comprises a command to clear contents of the self-refresh frame buffer; and
   clear the contents of the self-refresh frame buffer in response to receipt of the second command from the display controller.

19. One or more non-transitory, computer-readable storage media comprising a plurality of instructions that in response to being executed cause a display device to:
   establish a secure, attested communication session between the display device and a display controller of a computing device;
   receive encrypted frame data from the display controller in response to establishing the secure, attested communication session;
   decrypt the encrypted frame data to generate frame data;
   display the frame data;
   receive a command from the display controller via a secure control channel of the secure attested communication session, wherein the command comprises a command to disable read back of a self-refresh frame buffer of the display device; and
   disable a read back capability of the self-refresh frame buffer in response to receiving the command from the display controller.

20. The one or more non-transitory, computer-readable storage media of claim 19, wherein to establish the secure, attested communication session comprises to attest to an origin of the display device using a private key provisioned to the display device.

21. The one or more non-transitory, computer-readable storage media of claim 19, further comprising a plurality of instructions that in response to being executed cause the display device to:
   receive a second command from the display controller via the secure control channel of the secure attested communication session, wherein the second command comprises a command to clear contents of the self-refresh frame buffer of the display device; and
   clear the contents of the self-refresh frame buffer in response to receiving the second command from the display controller.

* * * * *